(12) United States Patent
Koberstein et al.

(10) Patent No.: US 11,453,267 B2
(45) Date of Patent: Sep. 27, 2022

(54) INTEGRATED HEAT PUMP BUNDLED MODULE MOUNTING MANIFOLD

(71) Applicant: Ford Global Technologies, LLC, Dearborn, MI (US)

(72) Inventors: Manfred Koberstein, Troy, MI (US); Loren John Lohmeyer, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 132 days.

(21) Appl. No.: 16/577,613

(22) Filed: Sep. 20, 2019

(65) Prior Publication Data
US 2021/0086587 A1   Mar. 25, 2021

(51) Int. Cl.
| | | |
|---|---|---|
| *B60H 1/22* | (2006.01) | |
| *B60H 1/32* | (2006.01) | |
| *B60H 1/00* | (2006.01) | |

(52) U.S. Cl.
CPC ..... *B60H 1/00907* (2013.01); *B60H 1/00492* (2013.01); *B60H 1/00528* (2013.01); *B60H 1/00542* (2013.01); *B60H 1/22* (2013.01); *B60H 1/3228* (2019.05); *B60H 1/3229* (2013.01); *B60H 2001/006* (2013.01); *B60H 2001/00307* (2013.01); *B60H 2001/3242* (2013.01); *B60H 2001/3267* (2013.01)

(58) Field of Classification Search
CPC .............. B60H 1/00907; B60H 1/3228; B60H 1/00492; B60H 1/00528; B60H 1/00542; B60H 1/22; B60H 1/3229; B60H 2001/00307; B60H 2001/006; B60H 2001/3242; B60H 2001/3267; B60H 1/00571; H01M 8/2485; F28F 3/12; F28F 1/045

See application file for complete search history.

(56) References Cited

U.S. PATENT DOCUMENTS

| | | | |
|---|---|---|---|
| 2,528,557 A | | 11/1950 | Shapiro |
| 4,978,507 A | * | 12/1990 | Levin ............... G01N 33/54366 222/479 |
| 6,125,651 A | * | 10/2000 | Tack ..................... F25B 43/006 62/503 |
| 6,234,191 B1 | | 5/2001 | Clarke |
| 2003/0008194 A1 | * | 1/2003 | Cargneli ............ H01M 8/2484 429/413 |
| 2003/0037828 A1 | | 2/2003 | Gander et al. |
| 2004/0020233 A1 | | 2/2004 | Ramachandran et al. |
| 2006/0198150 A1 | * | 9/2006 | Kinoshita ................. F28F 3/12 362/373 |
| 2007/0113575 A1 | | 5/2007 | Borre et al. |
| 2019/0039440 A1 | * | 2/2019 | Calderone ............ B60K 7/0007 |

* cited by examiner

*Primary Examiner* — Frantz F Jules
*Assistant Examiner* — Martha Tadesse
(74) *Attorney, Agent, or Firm* — Vichit Chea; Price Heneveld LLP

(57) ABSTRACT

A vehicle HVAC system including a heat pump system. The heat pumps system including a refrigerant module mounting manifold, the manifold including a first plate and a second plate. The first plate and the second plate are configured to couple together such that together they define a plurality of channels for directing the flow of refrigerant through the heat pump system. One or more auxiliary modules are fluidly coupled to the refrigerant module mounting manifold.

20 Claims, 8 Drawing Sheets

INTEGRATED HEAT PUMP BUNDLED MODULE MOUNTING MANIFOLD

FIELD OF THE DISCLOSURE

The present disclosure generally relates to heat pumps for vehicles, and more particularly to heat pump module mounting manifolds.

BACKGROUND OF THE DISCLOSURE

Various types of heating, ventilation, and air conditioning ("HVAC") systems have been developed for motor vehicles. Known systems may utilize coolant that has been heated by an internal combustion engine to heat air that is supplied to the passenger compartment. Vehicle HVAC systems may also include air conditioning systems to cool and/or dehumidify air that is supplied to the vehicle interior space.

Heat pumps may be used in the cooling and heating system of hybrid motor vehicles or entirely battery-powered electric motor vehicles, since a heat pump can be used for both cooling and heating the inside passenger cabin in the absence of the heat source provided by traditional internal combustion engines. In the cooling mode, a heat pump operates in the same manner as a traditional air-conditioning system. In the heating mode, a heat pump is typically more efficient than simple electrical resistance heaters and may be more effective at heating than such electrical resistance heaters using the same amount of electricity. Thus, the utilization of a heat pump, in lieu of or in addition to an electrical resistance heater, may be desired to provide an increased driving range in an electric motor vehicle.

Some disadvantage to such systems, however, are the potential for refrigerant leaks as the refrigerant is directed through the system, and difficulty in the assembly process. Some system designs have a large number of refrigerant joints and parts resulting in a system with a high potential for leaks and an intensive assembly process. Accordingly, a heat pump system design with few refrigerant joints and fewer parts for ease of assembly is desired.

SUMMARY OF THE DISCLOSURE

According to one aspect of the present disclosure, a heat pump system is provided including a manifold for directing refrigerant flow through the system. The manifold includes a first plate and a second plate configured to couple to the first plate. The first plate and the second plate together define a plurality of channels configured to direct the flow of refrigerant through the system. The manifold further includes a manifold module integrally formed with one of the first plate and the second plate. The heat pump system further includes an auxiliary module fluidly coupled to the manifold.

Embodiments of the first aspect of the invention can include any one or a combination of the following features:
- the auxiliary module comprises an accumulator;
- an accumulator case is integrally formed with one of the first plate and the second plate and is configured to couple to an accumulator cartridge and an accumulator cap;
- each of the first plate and the second plate comprise a portion of an accumulator case integrally formed therewith, the accumulator case configured to couple to an accumulator cartridge and an accumulator cap;
- the auxiliary module comprises a heat exchanger, a muffler, a liquid-gas separator valve, an expansion valve, an accumulator, a compressor, a check valve, a stop valve, a three-way valve, a four-way valve, or a combination thereof.

According to another aspect of the present disclosure, a refrigerant manifold is provided including a first plate and a second plate. The second plate is configured to couple to the first plate to define a plurality of channels for directing the flow of refrigerant through the manifold.

Embodiments of the second aspect of the invention can include any one or a combination of the following features:
- a manifold module integrally formed with one of the first plate and the second plate;
- the manifold module comprises a liquid-gas separator valve;
- the manifold module comprises an expansion valve integrally formed therewith, further wherein the manifold is configured to couple to an expansion valve motor for controlling the operation of the expansion valve;
- the manifold module comprises a valve integrally formed with the manifold and configured to direct the flow of refrigerant through the manifold;
- the manifold comprises aluminum;
- the manifold comprises plastic;
- one of the first plate and the second plate defines a plug and the other of the first plate and the second plate defines a socket configured to couple to the plug such that the socket and the plug together define a channel for directing the flow of refrigerant;
- the first plate and the second plate are configured to couple together such that they form a seal for preventing a leakage of refrigerant from the plurality of channels;
- a gasket positioned between the first plate and the second plate and configured to prevent a leakage of refrigerant from the manifold.

According to yet another aspect of the present disclosure, a vehicle including a heat pump system is provided. The heat pump system including a refrigerant manifold including a first plate and a second plate. The first plate and the second plate are configured to couple together such that together they define a plurality of channels for directing the flow of refrigerant through the heat pump system. The heat pump system further includes an auxiliary module fluidly coupled to the refrigerant manifold.

Embodiments of the first aspect of the invention can include any one or a combination of the following features:
- the refrigerant manifold further comprises a manifold module integrally formed with the refrigerant manifold;
- the manifold module comprises an expansion valve;
- the refrigerant manifold is configured to couple to an expansion valve motor for controlling the flow of refrigerant through the expansion valve;
- the refrigerant manifold further comprises an accumulator casing integrally formed therewith.

These and other aspects, objects, and features of the present disclosure will be understood and appreciated by those skilled in the art upon studying the following specification, claims, and appended drawings.

DETAILED DESCRIPTION OF THE EMBODIMENTS

Figure 2:
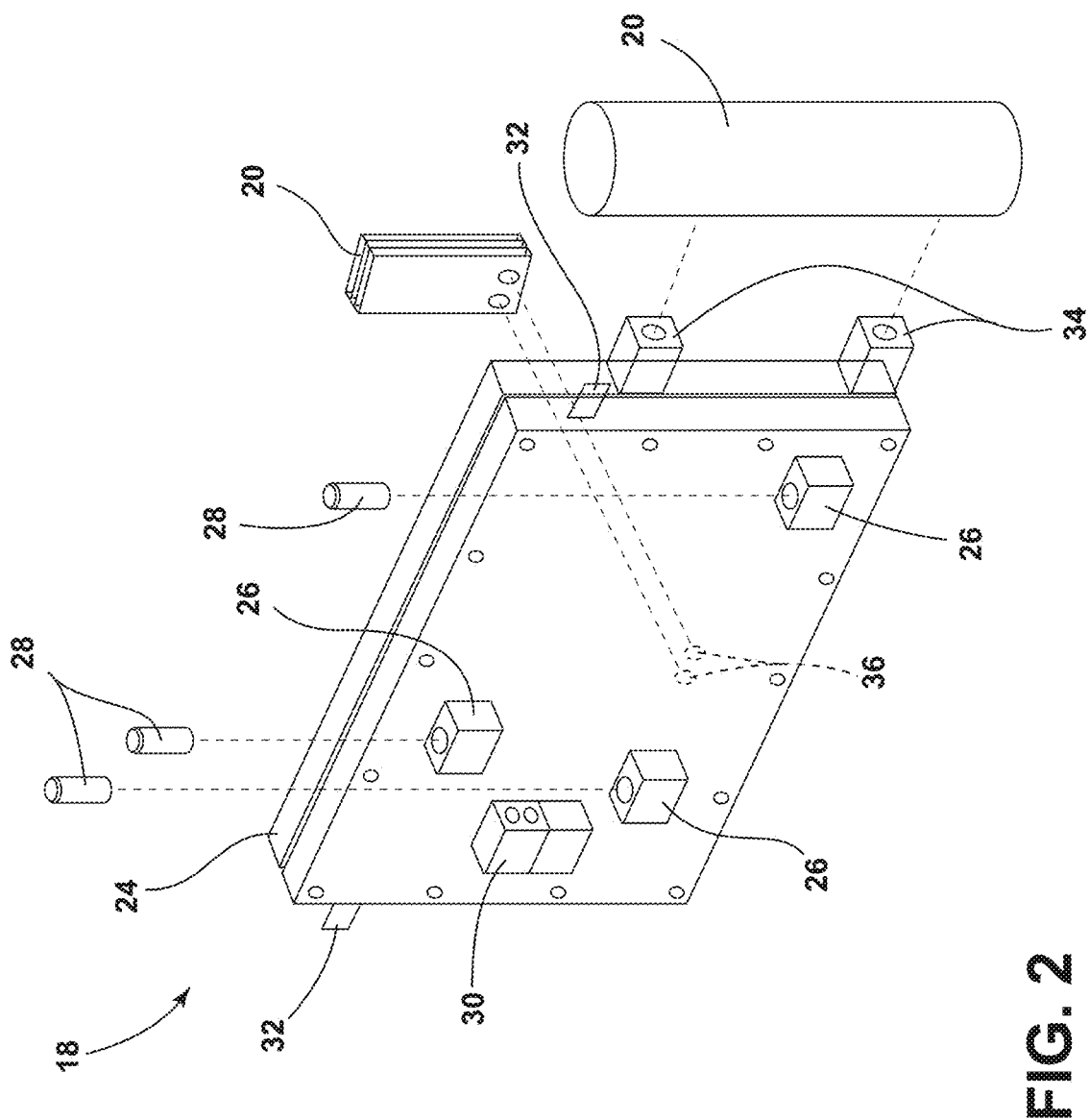
FIG. 2 is a partially exploded perspective view of a refrigeration module mounting manifold according to one aspect of the present disclosure.

For purposes of description herein, the terms "upper," "lower," "right," "left," "rear," "front," "vertical," "horizontal," and derivatives thereof shall relate to the disclosure as oriented in FIG. 2. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 1:
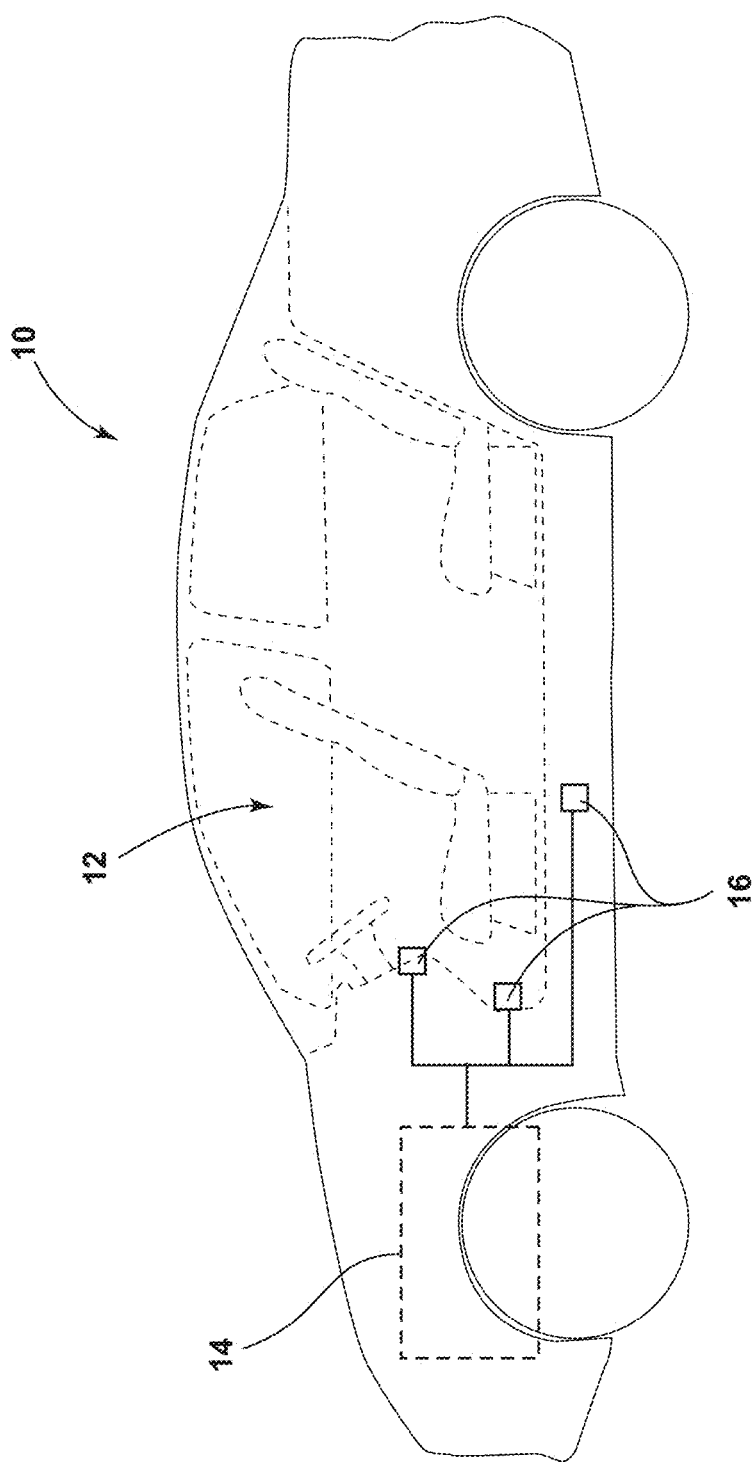
FIG. 1 is a partially schematic side elevational view of a vehicle including an HVAC system according to one aspect of the present disclosure.

Referring to FIG. 1, a vehicle is illustrated including a passenger compartment 12 configured to house one or more passengers of the vehicle 10. In some instances, heating or cooling of the passenger compartment 12 may be desired to insure passenger comfort. Accordingly, an HVAC system 14 may be provided including one or more ducts 16 to provide conditioned air to the passenger compartment 12. In some embodiments, the HVAC system 14 may comprise a heat pump system 14. As used herein, the term "heat pump" refers to a vapor-compression refrigeration device optimized for high efficiency in both directions of thermal energy transfer. Such heat pump systems employ a refrigerant as the working fluid in circulation between at least a compressor, a condenser, an expansion valve, and an evaporator. Since the operation of heat pumps may be reversible, heat pumps may be adapted to work in either direction, e.g., in both a cooling mode and a heating mode to provide cooling or heating to the inside passenger compartment Referring now to FIG. 2, the heat pump system 14 includes a module mounting manifold 18 configured to couple/direct refrigerant to one or more HVAC modules. As illustrated, the manifold 18 comprises a plate manifold including a first plate 22 and a second plate 24. The first plate 22 and/or the second plate 24 include a plurality of grooves formed on an interior surface such that the first plate 22 and the second plate 24 together define a plurality of channels and exterior openings 36 for directing flow through the manifold and between auxiliary modules 20. Auxiliary modules 20 may comprise any device for directing the flow or altering the state of a refrigerant through a refrigeration system including, but not limited to, a heat exchanger (e.g. a condenser, an evaporator, a chiller, etc. . . . ), a muffler, a liquid-gas separator valve, an expansion valve, an accumulator, a compressor, a check valve, a stop valve, a three-way valve, a four-way valve, or a combination thereof. As depicted, the first plate 22 and the second plate 24 are joined together by a plurality of fasteners (e.g. bolts); however, the first plate 22 and the second plate 24 may be joined together by other connecting features (e.g. integral attachment features, press fitting, adhesive, etc. . . . ) without departing from the scope of the disclosure.

The manifold 18 may be formed by any suitable forming process (e.g. machined, molded, or cast, etc. . . . ), out of a material suitable for directing pressurized refrigerant through the heat pump system 14. In some embodiments, the manifold 18 may be formed from aluminum. In other embodiments, the manifold 18 may be formed of plastic. In embodiments where the manifold 18 is formed of plastic, a suitable material may need to be selected to withstand the pressures generated within the heat pump system 14, the high temperatures generated in an under-hood environment of the vehicle 10, and to resist water infiltration into the heat pump system 14. In some embodiments, the manifold 18 comprises multiple layers of plastic including one or more barriers to moisture absorption.

In some embodiments, the manifold 18 may include one or more manifold modules integrally formed with the manifold 18. In some embodiments, the manifold 18 may include one or more expansion valves 26 integrally formed with the first plate 22 and/or the second plate 24. The manifold 18 may further be configured to couple to one or more expansion valve motors 28 by a c-clip or other suitable fastener for controlling the flow of refrigerant through the expansion valves 26. The manifold 18 may also include a liquid-gas separator ("LGS") valve 30 integrally formed therewith.

The manifold 18 may additionally include one or more mounting brackets 32 for mounting the manifold 18 to the vehicle 10. In some embodiments, the manifold 18 may also include module brackets 34 for mounting one or more auxiliary modules 20 to the manifold 18. Such brackets may include, but are not limited to, fastening features, integral attachment (i.e. snap-fit) features, adhesives, press-fit features, and other suitable arrangements for mounting the manifold modules to the manifold 18 and/or the manifold 18 to the vehicle 10.

Figure 3:
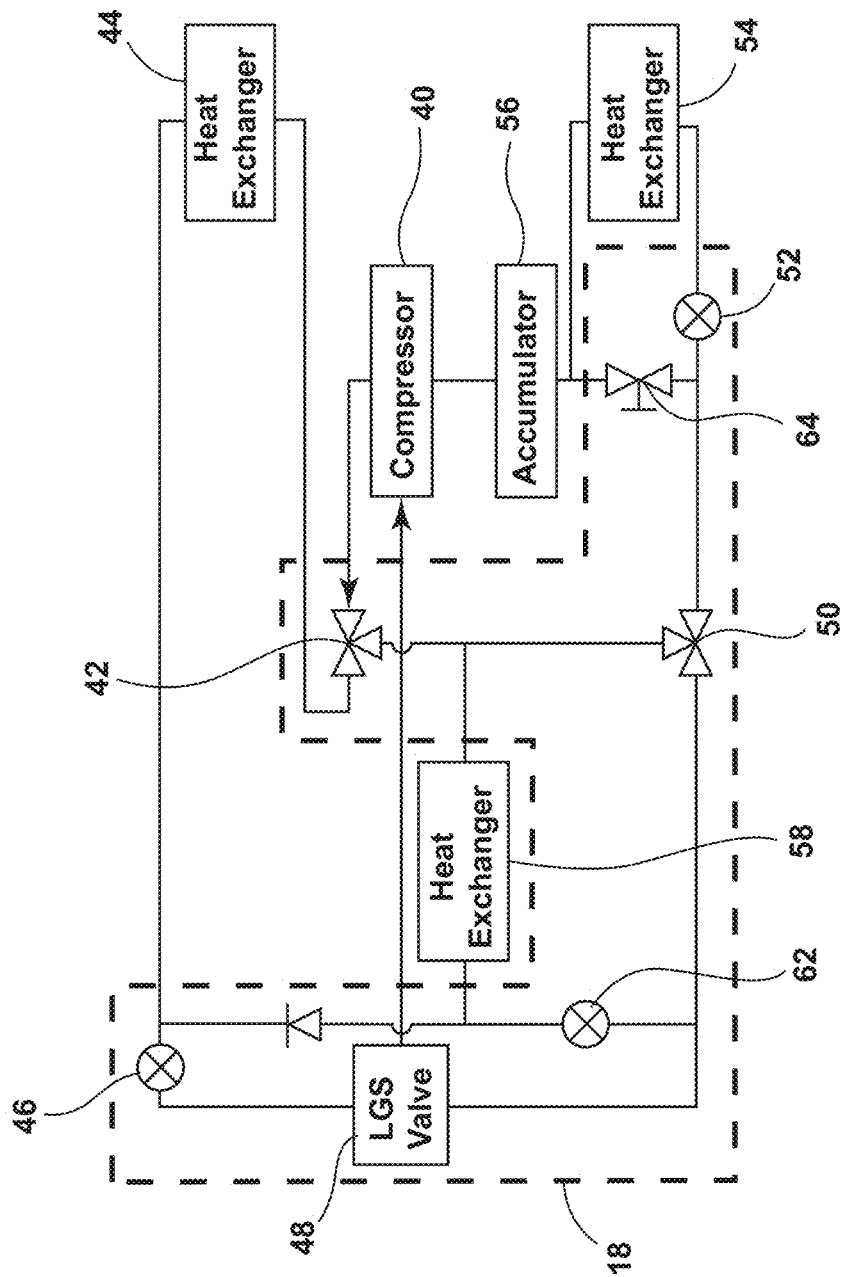
FIG. 3 is a schematic view of an exemplary heat pump system.
Figure 4:
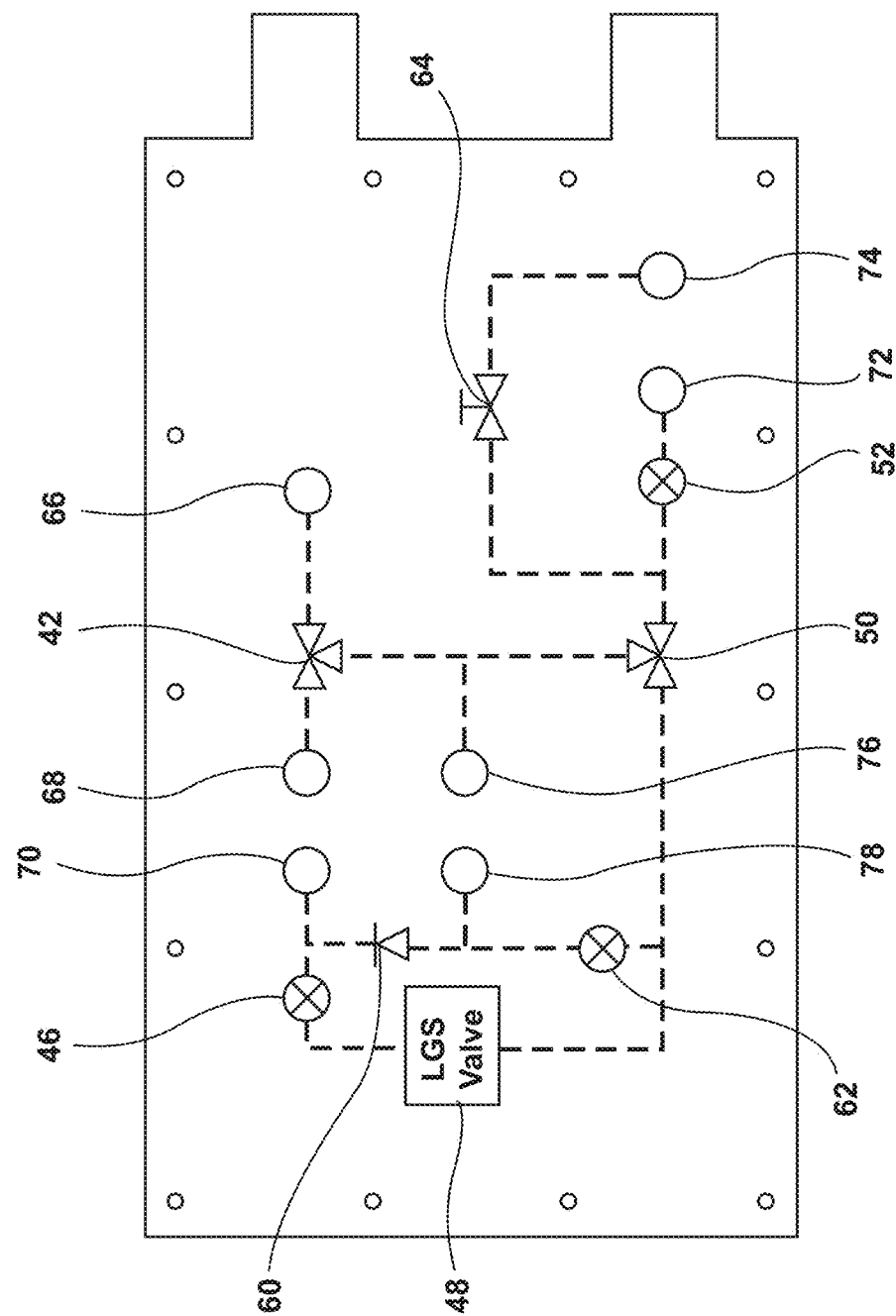
FIG. 4 is a partially schematic side elevational view of a refrigeration module mounting manifold according to one aspect of the present disclosure.

Referring now to FIGS. 3 and 4, an exemplary heat pump system 14 is depicted including a compressor 40, a first three-way valve 42, a first interior heat exchanger 44, a first expansion valve 46, a LGS valve 48, a second three-way valve 50, a second expansion valve 52, a second interior heat exchanger 54, an accumulator 56, an exterior heat exchanger 58, a check valve 60, a third expansion valve 62, and a stop valve 64. As outlined by the dotted line in FIG. 3, one or more modules may be integrally formed with the manifold 18, and configured to direct flow through the one or more channels formed by the manifold 18. Additionally, the manifold 18 includes a plurality of exterior openings (66-78) configured to direct the flow of refrigerant to the auxiliary modules 20.

In an exemplary cooling mode of the heat pump system 14 depicted in FIGS. 3 and 4, refrigerant leaves or exits the compressor 40 as high-pressure saturated vapor and enters the manifold 18 through exterior opening 66. The high-pressure saturated vapor is then directed through the manifold 18 to the first three-way valve 42 and subsequently through exterior opening 76 to the exterior heat exchanger 58. As the refrigerant passes through the exterior heat exchanger 58, the refrigerant goes from a high-pressure saturated vapor to a high-pressure sub-cooled liquid. The refrigerant then reenters the manifold 18 through exterior opening 78 and is directed through check valve 60 to the first expansion valve 46. As the refrigerant passes through the first expansion valve 46, the refrigerant goes from a high-pressure sub-cooled liquid to an intermediate pressure liquid-vapor mixture. The intermediate pressure liquid-vapor mixture is then directed to LGS valve 48 where the vapor component of the intermediate-pressure liquid and vapor mixture is separated from the liquid component of the intermediate-pressure liquid and vapor mixture. The vapor component of the intermediate-pressure liquid and vapor mixture is returned to the compressor 40 through an exterior opening. The liquid component of the intermediate-pressure liquid and vapor mixture continues through the manifold 18 from the LGS valve 48 to the second three-way valve 50 where the refrigerant is directed to the second expansion valve 52. As the refrigerant passes through the second expansion valve 52, the refrigerant drops in pressure and become a low-pressure liquid and vapor mixture. The refrigerant is then directed through the exterior opening 72 to the second interior heat exchanger 54 where the refrigerant becomes a low-pressure saturated vapor. The low-pressure saturated vapor exits the second interior heat exchanger 54 and enters the accumulator 56. Low-pressure vapor refrigerant is then directed from the accumulator 56 back to the compressor 40.

In an exemplary heating mode of the heat pump system 14 depicted in FIGS. 3 and 4, refrigerant leaves the compressor 40 as high-pressure saturated vapor and enters the manifold 18 through exterior opening 66. The high-pressure saturated vapor is then directed through the manifold 18 to the first three-way valve 42 and subsequently through exterior opening 68 to the first interior heat exchanger 44. As the refrigerant passes through the exterior heat exchanger 58 the refrigerant goes from a high-pressure saturated vapor to a high-pressure sub-cooled liquid. The refrigerant then reenters the manifold 18 through exterior opening 70 and is directed to the first expansion valve 46. As the refrigerant passes through the first expansion valve 46, the refrigerant goes from a high-pressure sub-cooled liquid to an intermediate pressure liquid-vapor mixture. The intermediate pressure liquid-vapor mixture is then directed to LGS valve 48 where the vapor component of the intermediate-pressure liquid and vapor mixture is separated from the liquid component of the intermediate-pressure liquid and vapor mixture. The vapor component of the intermediate-pressure liquid and vapor mixture is then returned to the compressor 40 through an exterior opening. The liquid component of the intermediate-pressure liquid and vapor mixture continues through the manifold 18 from the LGS valve 48 to the third expansion valve 62. As the refrigerant passes through the third expansion valve 62, the refrigerant drops in pressure and become a low-pressure liquid and vapor mixture. The refrigerant is then directed through the exterior opening 78 to the exterior heat exchanger 58 where the refrigerant is heated to a low-pressure saturated vapor. The low-pressure saturated vapor exits the exterior heat exchanger 58 and reenters the manifold 18 through exterior opening 76 where the refrigerant is directed through the second three-way valve 50 and the stop valve 64 to exterior opening 74. The refrigerant then leaves the manifold 18 through exterior opening 74 and is directed to the accumulator 56. Low-pressure vapor refrigerant is then directed from the accumulator 56 back to the compressor 40.

It will be understood by one skilled in the art that the heat pump system 14 as depicted in FIGS. 3 and 4 and the modes of operation as described herein are only exemplary. Alternative embodiments and system designs may exist without departing from the scope of the present disclosure. Additionally, in various embodiments, modules may be integrally formed with the manifold 18, mounted to the manifold 18, or fluidly coupled to the manifold 18 through refrigerant tubing to address packaging and/or design requirements of the specific application without departing from the scope of the present disclosure. For example, while in one embodiment the one or more manifold modules may be integrally formed with the manifold 18, packaging concerns of another embodiment may require the one or more manifold modules to be positioned exterior to the manifold 18 and fluidly coupled to the manifold 18 through refrigerant tubing.

Figure 5:
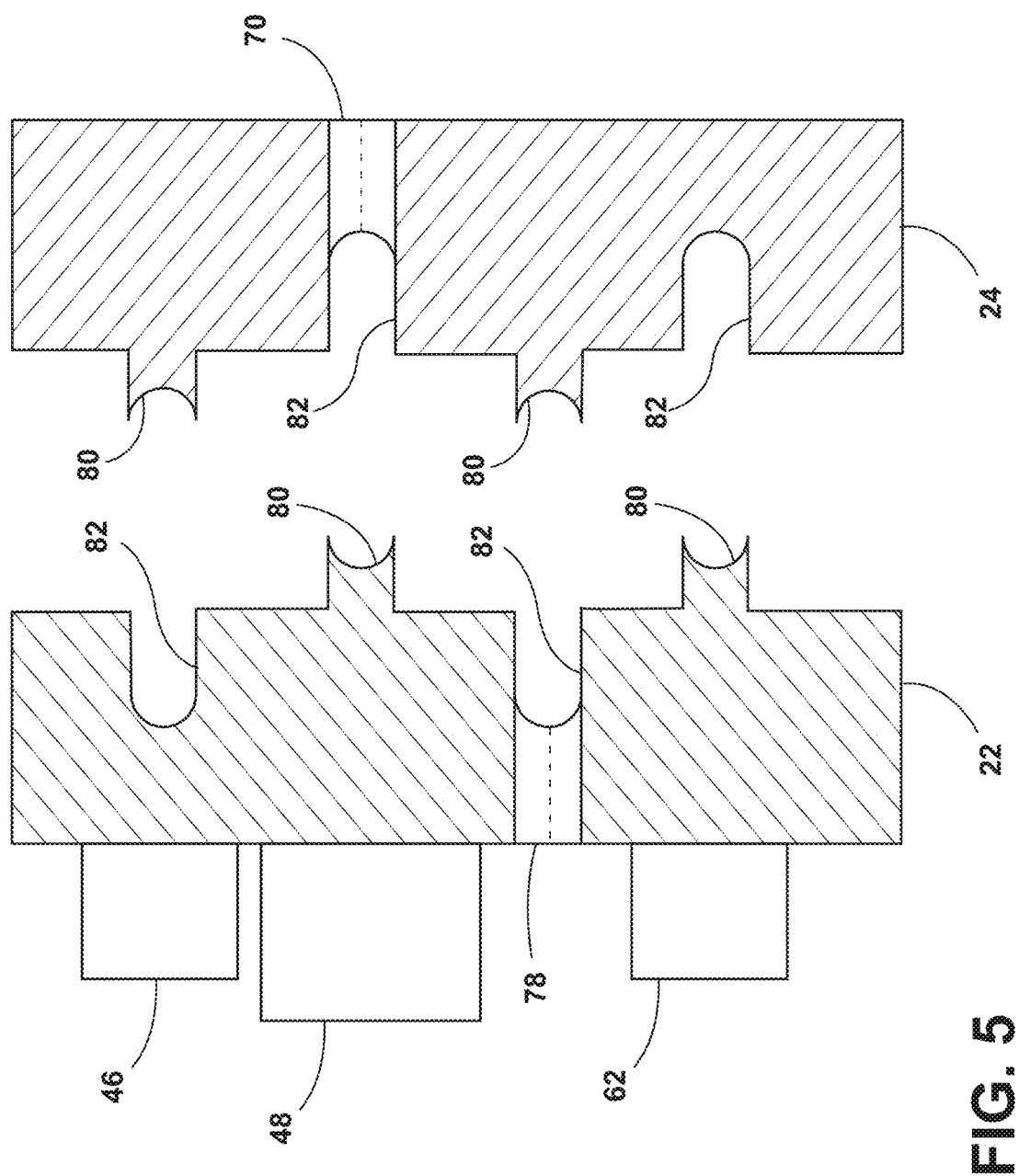
FIG. 5 is an exploded side cross-sectional elevational view of a refrigeration module mounting manifold according to one aspect of the present disclosure.

Referring now to FIG. 5, one or more channels are defined at an interface of the first plate 22 and the second plate 24. As depicted, the first plate 22 and/or the second plate 24 of the manifold 18 define one or more interlocking features (i.e. plugs and sockets). The first plate 22 and the second plate 24 each define at least one plug 80 and/or at least one socket 82. The socket 82 is configured to couple to the plug 80 such that the plug 80 and the socket 82 together define a channel through which refrigerant may flow. In some embodiments, the plug 80 and the socket 82 may be configured to create a seal along their interface to prevent the refrigerant from leaking from the channel. As depicted in FIG. 5, the plug 80 and the socket 82 define a single channel; however, in alternative embodiments the plug 80 and socket 82 may comprise a plurality of grooves such that together they define a plurality of channels. In some embodiments, the first plate 22 and the second plate 24 may comprise a plurality of grooves along a flat surface to define one or more channels without any interlocking features. Additionally, the profile of the channels of FIG. 5 are depicted as being substantially circular, however, any profile (e.g. square, rectangular, etc. . . . ) may be provided without departing from the scope of the present disclosure.

The channels defined by the manifold 18 may be fluidly coupled to one or more exterior openings (66-78). The exterior openings (66-78) may be formed in the first plate 22 and or the second plate 24 of the manifold 18. As depicted, the exterior openings (66-78) lead straight to a flat exterior surface of the manifold 18. However, it is contemplated that the exterior openings (66-78) and/or manifold 18 may include one or more features for coupling one or more auxiliary modules 20 to the manifold 18. This may include, but is not limited to, conventional mounting bracket configurations for refrigeration lines, varying diameters for high-pressure and low-pressure lines, attachment features for receiving bolts or other fasteners, countersinks for receiving a refrigeration tube fitting, protruding cylindrical features for receiving tubing to be fastened by a worm-gear clamp or similar device, and other features for fluidly coupling auxiliary modules 20 to the manifold 18. Additionally, in some embodiments, exterior openings may be formed along an interface at the periphery of the first plate 22 and the second plate of the manifold 18 such that together the first plate 22 and the second plate 24 define the exterior opening. An exterior opening defined by both the first plate 22 and the second plate 24 may include a variety of attachment features for coupling an auxiliary module 20 to the manifold 18 including, but not limited to, one or more grooves configured to couple to an annular ring of the auxiliary module 20 to hold the auxiliary module 20 in place.

Figure 6:
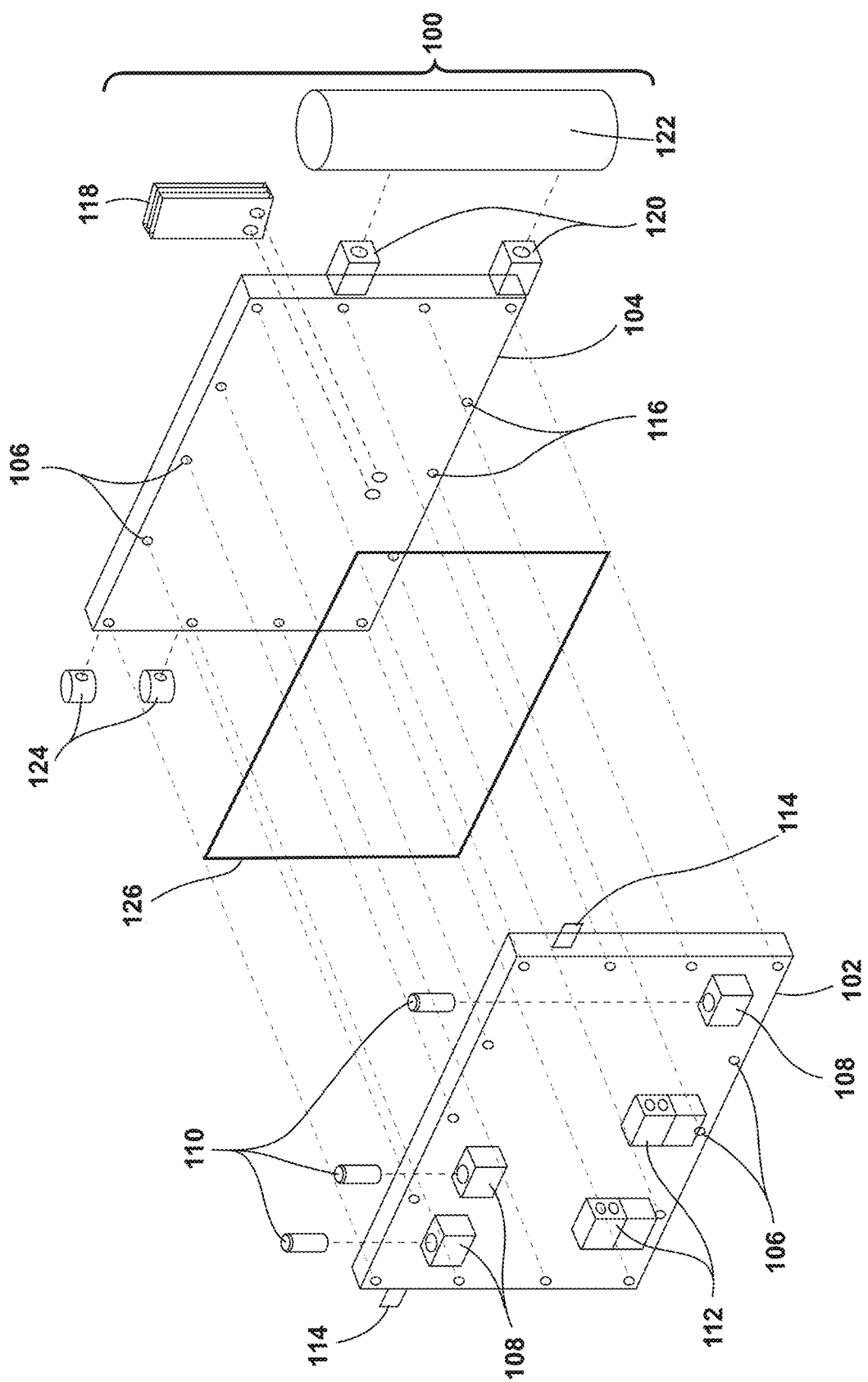
FIG. 6 is an exploded perspective view of a refrigeration module mounting manifold according to one aspect of the present disclosure.

Referring now to FIG. 6, another embodiment of a module mounting manifold 100 is provided comprising a first plate 102 and a second plate 104. The first plate 102 and second plate 104 may be similar in structure to the first plate 22 and the second plate 24 of FIG. 2 in that the first plate 102 and the second plate 104 are configured to define a plurality of channels and exterior openings 116 for directing the flow of refrigerant through the manifold 100 and between modules of a heat pump system, however, the actual configuration of the channels may vary. The first plate 102 and the second plate 104 also define a plurality of fastening features 106 for joining the first plate 102 and the second plate 104 together; however, the first plate 102 and the second plate 104 may be joined in a variety of ways as discussed in reference to FIG. 2.

As shown in FIG. 6, the first plate 102 includes a plurality expansion valves 108 and LGS valves 112 integrally formed with the first plate 102 for affecting the flow of refrigerant in the manifold 100. The first plate 102 is also be configured to couple to one or more expansion valve motors 110 for controlling the flow of refrigerant through the expansion valves 108. The expansion valve motors 110 may be coupled to the first plate 102 by c-clips or by other suitable fasteners. Additionally, the first plate 102 includes mounting brackets 114 for attaching the manifold 100 to the vehicle 10.

The second plate 104 includes exterior openings 116 for fluidly coupling a water-cooled condenser 118 to the manifold 100. The exterior openings 116 may be similar in design to exterior openings (66-78) in FIG. 5. The second plate 104 further comprises a pair of accumulator brackets 120 for mounting an accumulator 122 to the manifold 100. Additionally, the second plate 104 is configured to couple to one or more mufflers 124

Also provided in FIG. 6 is gasket 126 disposed around the periphery of the manifold 100. The gasket 126 may comprise any suitable material (e.g. neoprene, nitrile rubber (NBR), highly saturated nitrile (HSN), chloroprene, etc. . . . ) for sealing the first plate 102 and the second plate 104 to prevent the leaking of refrigerant. The gasket 126 may also comprise any suitable profile and/or shape for preventing the leakage of refrigerant within the manifold 100.

Figure 7:
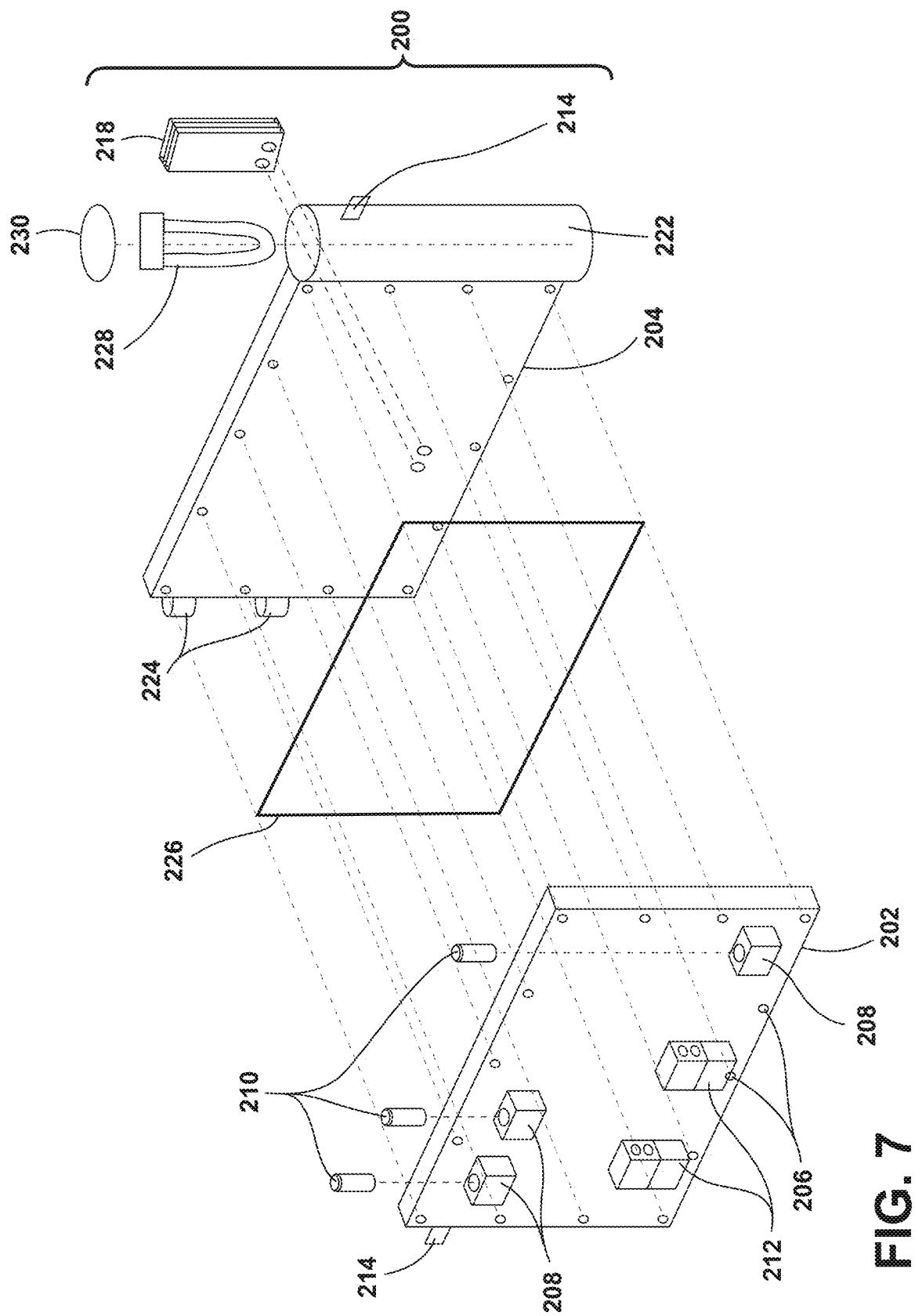
FIG. 7 is an exploded perspective view of a refrigeration module mounting manifold according to one aspect of the present disclosure.

Referring now to FIG. 7, manifold 200 is provided. Manifold 200 is similar in design to manifold 100 of FIG. 6, however, manifold 200 includes second plate 204 with integrated mufflers 224 and accumulator case 222. The accumulator case 222 is integrally formed with the second plate 204 and may include an opening configured to receive/couple to an accumulator cartridge 228 and an accumulator cap 230. The accumulator cartridge 228 and the accumulator cap 230 may be held in place by a c-clip or other suitable fastening means.

Figure 8:
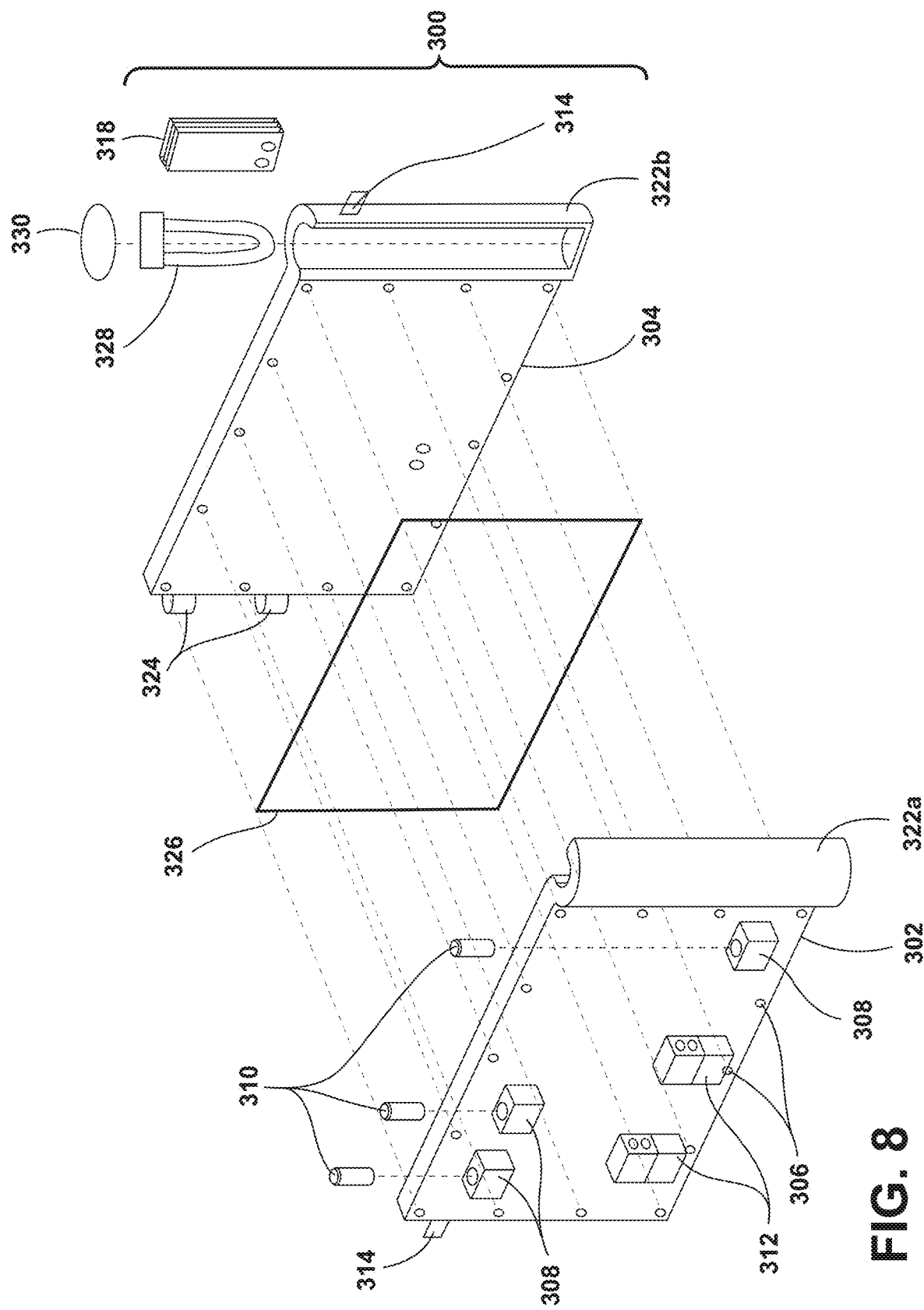
FIG. 8 is an exploded perspective view of a refrigeration module mounting manifold according to one aspect of the present disclosure.

Referring now to FIG. 8, manifold 300 is provided. Manifold 300 is similar in design to manifold 200 of FIG. 7. However, manifold 300 includes an accumulator case comprising a first accumulator case portion 322*a* integrally formed with a first plate 302 and a second accumulator case portion 322*b* integrally formed with a second plate 304. The first plate 302 and the second plate 304 are configured to be coupled together such that the first accumulator case portion 322*a* and the second accumulator case portion 322*b* form a compartment including an opening configured to receive/couple to an accumulator cartridge 328 and an accumulator cap 330. The accumulator cartridge 328 and the accumulator cap 330 may be held in place by a c-clip or other suitable fastener means.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A refrigerant manifold comprising:
a first plate; and
a second plate coupled with the first plate to define a plurality of channels for directing a flow of refrigerant through the refrigerant manifold, wherein the first plate and the second plate define a plurality of plugs and a plurality of sockets, and wherein the plurality of sockets are configured to couple to the plurality of plugs such that the plurality of sockets and the plurality of plugs together define the plurality of channels for directing the flow of refrigerant, the plurality of channels being integrally formed into the plurality of plugs and the plurality of sockets, and wherein the plurality of channels direct the flow of refrigerant through the plurality of sockets and the plurality of plugs, and wherein a coupling of the plurality of plugs to the plurality of sockets provides a retaining force configured to at least partially couple the first plate to the second plate.

2. The refrigerant manifold of claim 1, further comprising a manifold module integrally formed with one of the first plate and the second plate.

3. The refrigerant manifold of claim 2, wherein the manifold module comprises a liquid-gas separator valve.

4. The refrigerant manifold of claim 2, wherein the manifold module comprises an expansion valve integrally formed therewith, and wherein the refrigerant manifold is configured to couple to an expansion valve motor for controlling operation of the expansion valve.

5. The refrigerant manifold of claim 2, wherein the manifold module comprises a valve integrally formed with the refrigerant manifold and configured to direct the flow of refrigerant through the refrigerant manifold.

6. The refrigerant manifold of claim 1, wherein the first plate and the second plate are coupled together such that they form a seal for preventing a leakage of refrigerant from the plurality of channels.

7. The refrigerant manifold of claim 1, further comprising a gasket positioned between the first plate and the second plate to prevent a leakage of refrigerant from the refrigerant manifold.

8. The refrigerant manifold of claim 1, wherein the refrigerant manifold is operably coupled to an HVAC system of a vehicle.

9. A heat pump system comprising:
a manifold for directing refrigerant flow through the system, the manifold comprising:
a first plate, wherein the first plate further comprises a first plurality of grooves;
a second plate coupled to the first plate, wherein the second plate further comprises a second plurality of grooves, and wherein the first plurality of grooves and the second plurality of grooves together at least partially define a plurality of channels configured to direct the flow of refrigerant through the system;
a plurality of plugs and a plurality of sockets defined on the first plate and the second plate, wherein the plurality of sockets are configured to couple to the plurality of plugs such that the plurality of sockets and the plurality of plugs together at least partially define the plurality of channels for directing the flow of refrigerant, the plurality of channels being at least partially integrally formed into the plurality of sockets and the plurality of plugs, and wherein the plurality of channels direct the flow of refrigerant through the plurality of sockets and the plurality of plugs, and wherein a coupling of the plugs to the sockets provides a retaining force configured to at least partially couple the first plate to the second plate; and
a manifold module integrally formed with one of the first plate and the second plate; and
an auxiliary module fluidly coupled to the manifold.

10. The heat pump system of claim 9, wherein the auxiliary module comprises an accumulator.

11. The heat pump system of claim 10, wherein the accumulator comprises an accumulator case, an accumulator cartridge, and an accumulator cap, wherein the accumulator case is integrally formed with one of the first plate and the second plate and is configured to couple to the accumulator cartridge and the accumulator cap.

12. The heat pump system of claim 10, wherein each of the first plate and the second plate comprise a portion of an accumulator case integrally formed therewith, the accumulator case configured to couple to an accumulator cartridge and an accumulator cap.

13. The heat pump system of claim 9, wherein the auxiliary module comprises a heat exchanger, a muffler, a liquid-gas separator valve, an expansion valve, an accumulator, a compressor, a check valve, a stop valve, a three-way valve, a four-way valve, or a combination thereof.

14. The heat pump system of claim 9, wherein the heat pump system is operably connected to an HVAC system of a vehicle.

15. A vehicle comprising:
a heat pump system comprising:
a refrigerant manifold comprising a first plate and a second plate wherein the first plate defines a first plurality of grooves, and wherein the second plate defines a second plurality of grooves, and wherein the first plate and the second plate coupled together at least partially define a plurality of channels from the first plurality of grooves and the second plurality of grooves, and wherein the plurality of channels are configured to direct a flow of refrigerant through the heat pump system;
a plurality of plugs and sockets defined on the first plate and the second plate, wherein the plurality of sockets and configured to couple to the plurality of plugs such that the plurality of sockets and plurality of plugs together at least partially define the plurality of channels for directing the flow of refrigerant, the plurality of channels being at least partially integrally formed into the plurality of sockets and the plurality of plugs, and wherein the plurality of channels direct the flow of refrigerant through the plurality of sockets and the plurality of plugs, and wherein the a coupling of the plugs to the sockets provides an interface with a friction force, and wherein the friction force provides a retaining force configured to at least partially coupled the first plate to the second plate; and p1 an auxiliary module fluidly coupled to the refrigerant manifold.

16. The vehicle of claim 15, wherein the refrigerant manifold further comprises a manifold module integrally formed with the refrigerant manifold.

17. The vehicle of claim 16, wherein the manifold module comprises an expansion valve.

18. The vehicle of claim 17, wherein the refrigerant manifold is coupled to an expansion valve motor for controlling the flow of refrigerant through the expansion valve.

19. The vehicle of claim 15, wherein the refrigerant manifold further comprises an accumulator casing integrally formed therewith.

20. The refrigerant manifold of claim 1, wherein the plurality of plugs define a first plurality of grooves, and wherein the plurality of sockets define a second plurality of grooves, and wherein the plurality of channels is further defined by the first plurality of grooves and the second plurality of grooves, and wherein the plurality of plugs are in fluid communication with the plurality of sockets.

* * * * *

UNITED STATES PATENT AND TRADEMARK OFFICE
CERTIFICATE OF CORRECTION

PATENT NO. : 11,453,267 B2
APPLICATION NO. : 16/577613
DATED : September 27, 2022
INVENTOR(S) : Koberstein et al.

It is certified that error appears in the above-identified patent and that said Letters Patent is hereby corrected as shown below:

In the Claims

Column 9:
Claim 5, Line 40;
"refigerant" should be --refrigerant--.

Column 10:
Claim 15, Line 57;
After "wherein" delete "the".

Signed and Sealed this
Thirteenth Day of December, 2022

Katherine Kelly Vidal
*Director of the United States Patent and Trademark Office*